July 6, 1943.   B. TREVOR   2,323,857
VOLTAGE CONTROL
Filed Dec. 31, 1941
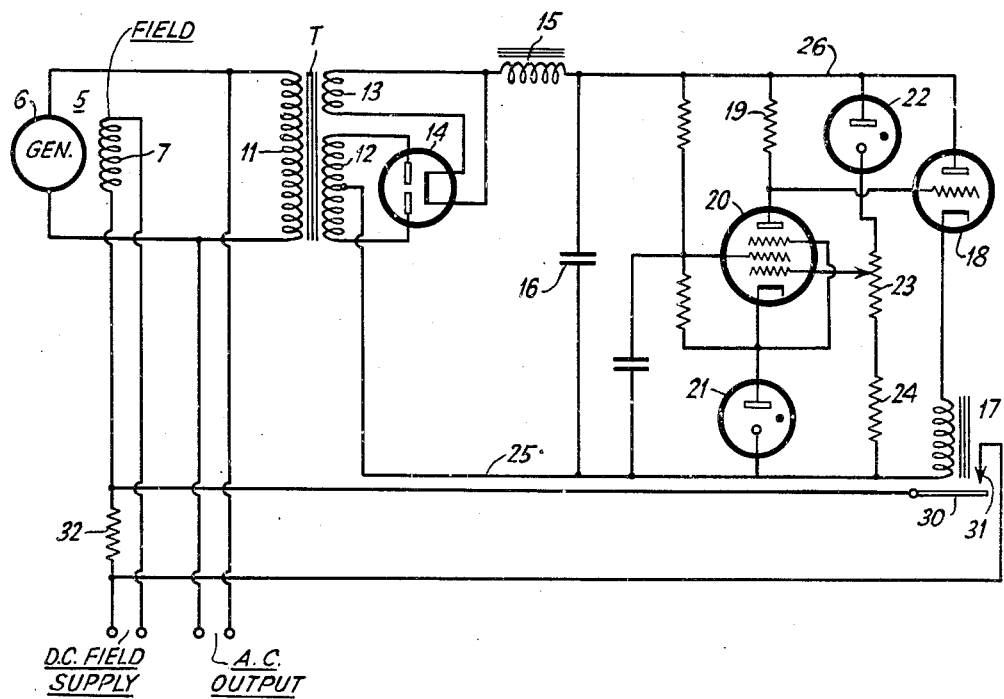
INVENTOR
BERTRAM TREVOR
BY H. S. Grover
ATTORNEY Patented July 6, 1943

2,323,857

UNITED STATES PATENT OFFICE 2,323,857

VOLTAGE CONTROL

Bertram Trevor, Riverhead, N. Y., assignor to Radio Corporation of America, a corporation of Delaware Application December 31, 1941, Serial No. 425,157

5 Claims. (Cl. 171—119)

The present invention relates to voltage regulators.

An object of the present invention is the provision of a system for maintaining constant the output voltage of an alternating current generator.

Another object is to improve the accuracy of control of a system, as aforesaid.

Still another object of the present invention is the provision of a voltage regulator having an extremely high degree of sensitivity.

A further object of the present invention is the provision of a voltage regulator which is simple and rugged in construction so that it may be conveniently used with portable or emergency power supplies for radio transmitters.

The foregoing objects, and others which may appear from the following detailed description, are attained by transforming the alternating current output of the generator to a much higher voltage whereby the absolute magnitude of the variations in voltage is increased, rectifying the high voltage and stripping from the rectified voltage a constant factor of desired magnitude to increase the percentage variation to any desired extent, amplifying the remainder and utilizing said amplified remainder to control the current through a discharge tube operating a control relay whereby the output of the generator may be controlled in accordance with variations of current in said discharge tube.

The present invention will be more fully understood by reference to the following detailed description which is accompanied by a drawing illustrating in diagrammatic form an embodiment of the present invention.

The figure shows an alternating current generator 5 having an armature 6 and a field winding 7. The alternating current output from the armature 6 of generator 5 is applied to the primary 11 of a transformer T having a high voltage secondary winding 12 and a low voltage winding 13 for supplying filament energization for rectifier tube 14. The anodes of rectifier tube 14 are connected as is conventional practice to the ends of winding 12. The rectified voltage output from rectifier tube 14 is applied to a filter including choke 15 and condenser 16. The constants of the filter are so chosen as to smooth out the alternating current ripple in the direct current output without at the same time having such a high time constant as to tend to smooth out the variations in amplitude due to voltage variations of the source. The filtered output is fed to the winding of a relay 17 through the space current path of a power amplifier triode 18. Across the output of the filter is connected a first series circuit including resistance 19, control tube 20, a gaseous discharge voltage regulator tube 21 and a second series circuit containing gaseous discharge voltage regulator tube 22 and resistors 23 and 24. Due to the action of regulator tube 21 the cathode of tube 20 is maintained at a constant positive potential above negative conductor 25. Likewise, the upper end of resistor 23 is maintained at a fixed potential negative with respect to the positive conductor 26. A variable tap on resistor 23 is connected to the control grid of tube 20. The position of the tap is so adjusted that under normal operating conditions a current is drawn by tube 20 such that the potential drop across tubes 20 and 21 and applied across the control grid-cathode circuit of amplifier tube 18 maintains the space current through tube 18 at a predetermined value.

Any change of potential on conductor 26 with respect to conductor 25 is amplified by the tube 20 and appears at the grid of tube 18 reversed in polarity, that is, a drop in potential across conductors 25 and 26 appears as a large increase in a positive direction of the potential at the grid of tube 18. This increase of potential of the grid of tube 18 causes a large current to flow through the winding of relay 18, closing its associated contacts 30, 31. The closure of these contacts shorts out a generator field resistor 32 which, in turn, gives rise to a higher alternating current output of the generator 5. If the voltage across conductors 25, 26 becomes too high the procedure described is reversed. The contacts 30, 31 of relay 17 open allowing the field resistor 32 to decrease the current flow through the generator field 7 which, in turn drops the potential across conductors 25, 26. Under normal operation, the relay 17 will be opening and closing continually in order to maintain the output voltage of the generator 5 constant.

It will be noted that the control is very sensitive since the voltage regulator tubes may be arranged to strip off the effect of the steady state direct voltage across conductors 25, 26 to any desired extent. Thus, if for example, VR150 voltage regulator tubes are used, maintaining the cathode of tube 20, 150 volts positive with respect to conductor 25 and the upper end of resistor 23 150 volts negative with respect to conductor 26 and a voltage of 300 volts across conductors 25 and 26. Then, assuming the tap on resistor 23 to be at the upper end thereof, a variation of 1% in 110 volts or 1.1 volts in the alternating current output of generator 5 will cause a variation of 3 volts ± across conductors 25, 26. The entire 3 volt variation will thus appear at the grid of tube 20 since the voltage regulator tubes effectively strip off the entire 300 volt steady state voltage across conductors 25 and 26. A variation in voltage of ±3 volts at the grid of tube 20 will be sufficient, if the proper tube 20 is chosen, to swing the tube from cut-off to saturation. Thus the voltage of the grid of tube 18 will vary from a value substantially equal that of conductor 26 to a very much lower value. Such extreme variation will not, of course, in practice occur since relay 17 will operate long before a voltage variation of this magnitude is obtained.

It should be clearly understood that relay 17 may be used to control other things than the field resistor 32 of the alternating current generator. For example, it may be used to operate the throttle of an engine driving the generator or a voltage control transformer in the generator output. Any of these means are effective to control the output voltage within close limits.

While I have particularly described and illustrated several embodiments of my invention, it is to be clearly understood that my invention is not limited thereto but that modifications may be made within the scope of the invention.

I claim:

1. A system for regulating the voltage output of a generator including means for multiplying the output voltage whereby the absolute amplitude of variations in voltage is increased, means for rectifying said multiplied voltage, a first thermionic discharge tube having at least an anode, a cathode and a control grid, a pair of gas discharge tubes each adapted to maintain a constant potential difference across their terminals, one of said gas tubes being connected in series between said cathode and negative terminal of said rectifying means, an anode resistor connected between said anode and the positive terminal of said rectifying means, the other of said gas tubes being connected between said positive terminal and said control grid, a resistance between said control grid and the negative terminal of said rectifying means and means responsive to the voltage drop through said anode resistor for regulating the output of said generator.

2. A system for regulating the voltage output of a generator including means for multiplying the output voltage whereby the absolute amplitude of variations in voltage is increased, means for rectifying said multiplied voltage, a first thermionic discharge tube having at least an anode, a cathode and a control grid, a pair of gas discharge tubes each adapted to maintain a constant potential difference across their terminals, one of said gas tubes being connected in series between said cathode and negative terminal of said rectifying means, an anode resistor connected between said anode and the positive terminal of said rectifying means, the other of said gas tubes being connected between said positive terminal and said control grid, a resistance between said control grid and the negative terminal of said rectifying means and means responsive to a decrease in the voltage drop through said anode resistor for increasing the voltage output of said generator.

3. A system for regulating the voltage output of a generator including means for rectifying the voltage from said generator, said means having positive and negative terminals, a thermionic discharge tube having at least an anode, cathode and control grid, means for maintaining the cathode of said thermionic discharge tube positive a predetermined amount with respect to said negative terminal, means for maintaining the control grid of said thermionic discharge tube negative a predetermined amount with respect to the positive terminal of said rectifying means, an anode resistor connected from the anode of said tube to said positive terminal, a relay having contacts for controlling the output of said generator and means responsive to a variation in the voltage drop through said anode resistor for controlling the opening and closing of said relay contacts.

4. A system for regulating the voltage output of a generator including means for multiplying the output voltage whereby the absolute amplitude of variations in voltage is increased, means for rectifying said multiplied voltage, said means having positive and negative terminals, a first thermionic discharge tube having at least an anode, a cathode and a control grid, means for maintaining the cathode of said tube positive a predetermined amount with respect to said negative terminal, means for maintaining the control grid of said tube negative a predetermined amount with respect to said positive terminal, an anode resistor connected from the anode of said tube to said positive terminal, a second thermionic discharge tube having an anode, a control grid and a cathode, the anode of said second tube being connected to said positive terminal, the control grid of said second tube being connected to the anode of said first tube and the cathode of said second tube being connected to said negative terminal through an operating winding of a relay, said relay having contacts adapted to increase the output of said generator when said contacts are closed.

5. A system for regulating the voltage output of a generator including means for multiplying the output voltage whereby the absolute amplitude of variations in voltage is increased, means for rectifying said multiplied voltage, said means having positive and negative terminals, a first thermionic discharge tube having at least an anode, a cathode and a control grid, means for maintaining the cathode of said tube positive a predetermined amount with respect to said negative terminal, means for maintaining the control grid of said tube negative a predetermined amount with respect to said positive terminal, an anode resistor connected from the anode of said tube to said positive terminal, a second thermionic discharge tube having an anode, a control grid and a cathode, the anode of said second tube being connected to said positive terminal, the control grid of said second tube being connected to the anode of said first tube and the cathode of said second tube being connected to said negative terminal through an operating winding of a relay, said generator having a field winding, and a resistance in series between said field winding and a source of excitation, the contacts of said relay being connected across said resistance for controlling the output voltage of said generator.

BERTRAM TREVOR.